United States Patent
Kim et al.

(10) Patent No.: US 9,185,397 B2
(45) Date of Patent: Nov. 10, 2015

(54) 3-DIMENSIONAL IMAGE DISPLAY DEVICE INCLUDING A BARRIER PANEL HAVING OPENINGS AND DRIVING METHOD THEREOF

(71) Applicant: Samsung Display Co., Ltd, Yongin (KR)

(72) Inventors: Kang Min Kim, Seoul (KR); Sang Min Jeon, Yongin-si (KR); Kwan-Ho Kim, Yongin-si (KR); Seon Ki Kim, Anyang-si (KR); Yong Doo Park, Jeonju-si (KR); A Ram Song, Suwon-si (KR); Jae Woo Jung, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 361 days.

(21) Appl. No.: 13/669,903

(22) Filed: Nov. 6, 2012

(65) Prior Publication Data
US 2013/0335385 A1 Dec. 19, 2013

(30) Foreign Application Priority Data

Jun. 18, 2012 (KR) .......... 10-2012-0064926

(51) Int. Cl.
*H04N 13/04* (2006.01)
(52) U.S. Cl.
CPC ................. *H04N 13/0409* (2014.11)
(58) Field of Classification Search
CPC .................................................. H04N 13/0409
USPC ...................................... 345/76–106, 204–215
See application file for complete search history.

(56) References Cited

U.S. PATENT DOCUMENTS

| 7,317,494 | B2 | 1/2008 | Mashitani et al. | |
|---|---|---|---|---|
| 7,825,999 | B2 | 11/2010 | Chestak et al. | |
| 2006/0114561 | A1 | 6/2006 | Mashitani et al. | |
| 2010/0182291 | A1* | 7/2010 | Kim et al. | |
| 2011/0051239 | A1 | 3/2011 | Daiku | |
| 2012/0013651 | A1* | 1/2012 | Trayner et al. ............. | 345/690 |
| 2012/0218325 | A1* | 8/2012 | Hiroki et al. .............. | 345/697 |
| 2012/0242723 | A1* | 9/2012 | Miyake ..................... | 345/694 |

FOREIGN PATENT DOCUMENTS

| JP | 2004118140 | 4/2004 |
|---|---|---|
| JP | 2005172925 | 6/2005 |
| JP | 2010066511 | 3/2010 |
| JP | 2012022084 | 2/2012 |
| KR | 1020070099764 | 10/2007 |

* cited by examiner

*Primary Examiner* — Ryan A Lubit
(74) *Attorney, Agent, or Firm* — H.C. Park & Associates, PLC

(57) ABSTRACT

A 3-dimensional image display device and a driving method thereof, the method including using a first array of a matrix of unit pixels to form an image while a remaining array of the unit pixels displays black, and forming openings in a barrier panel to expose the unit pixels of the first array, the width of the openings ranging from 1.5 to 2 times the width of the exposed unit pixels.

25 Claims, 11 Drawing Sheets

FIG. 13

| | | R | G | B | R | G | B | R | G | B | R | G | B |
|---|---|---|---|---|---|---|---|---|---|---|---|---|---|
| Rendering Sequence | 1. | V1 | off | V3 | off | V1 | off | V3 | off | V1 | off | V3 | off |
| | 2. | off | V2 | off | V4 | off | V2 | off | V4 | off | V2 | off | V4 |
| | 3. | V3 | off | V1 | off | V3 | off | V1 | off | V3 | off | V1 | off |
| | 4. | off | V4 | off | V2 | off | V4 | off | V2 | off | V4 | off | V2 |

Horizontal line →

3-DIMENSIONAL IMAGE DISPLAY DEVICE INCLUDING A BARRIER PANEL HAVING OPENINGS AND DRIVING METHOD THEREOF

CROSS-REFERENCE TO RELATED APPLICATION

This application claims priority to and the benefit of Korean Patent Application No. 10-2012-0064926, filed on Jun. 18, 2012, which is hereby incorporated by reference for all purposes as if fully set forth herein.

BACKGROUND

1. Field

Aspects of the present invention relate to a 3-dimensional image display device and a driving method thereof, and more particularly, to an autostereoscopic 3-dimensional image display device and a driving method thereof.

2. Discussion of the Background

In general, a 3-dimensional stereoscopic image is realized based on a stereo vision principle and a disparity between a viewer's two eyes, that is, a binocular disparity appearing due to the distance between two eyes, which is approximately 65 cm. This distance may be the most important factor for a 3-dimensional feeling. That is, the left and right eyes see different 2-dimensional images, and if the two 2-dimensional images are transferred to a brain via retinas, the brain accurately combines the images to reproduce the depth and reality of the 3-dimensional image. Such an ability is generally called stereography.

Such 3-dimensional image display devices use binocular disparities, and are classified into a stereoscopic type, including a polarization type and a time division type, and an autostereoscopic type, including a parallax-barrier type, a lenticular type, and a blinking light type, according to whether an observer wears a separate pair of glasses.

An autostereoscopic 3-dimensional image display device employs an apparatus for separating a left-eye image and a right-eye image, such as a lenticular lens or a barrier on a liquid crystal display. The autostereoscopic 3-dimensional display device allows an observer to watch a 3-dimensional image without using an additional pair of glasses. However, while a viewer situated at a fixed location can watch a 3-dimensional image, if the viewer leaves this location, cross-talk may be generated. That is, a left-eye image may be perceived by the right eye of the viewer, such that the viewer cannot perceive a normal 3-dimensional image. Further, since a position at which the viewer can view the 3-dimensional image is not wide, the quality of 3-dimensional image may be reduced even when the viewer moves only a small amount. In addition, the display image may be degraded by interference, such as a moire phenomenon.

The above information disclosed in this Background section is only for enhancement of understanding of the background of the invention and therefore it may contain information that does not form the prior art that is already known in this country to a person of ordinary skill in the art.

SUMMARY

Exemplary embodiments of the present invention provide a driving method of a 3-dimensional image display device having advantages of reducing a moire phenomenon, widening a viewing zone at which a viewer can see a 3-dimensional image, and/or reducing cross-talk.

An exemplary embodiment of the present invention provides a driving method of a 3-dimensional image display device that includes a display panel including a matrix of pixels and a barrier panel disposed on the display panel, the driving method including: using a first array of the pixels to display an image while using a second array of the unit pixels to display black; and forming openings in the barrier panel through which the unit pixels of the first array are exposed, the width of each opening ranging from 1.5 to 2 times the width of the unit pixels.

Another exemplary embodiment of the present invention provides a 3-dimensional image display device including: a display panel including a matrix of unit pixels; a barrier panel disposed on the display panel and configured to form openings and barriers; and a controller configured to form an image using the display panel and the barrier panel, wherein the controller is configured to use a first array of the unit pixels to form the image and to use a second array of the unit pixels to display black, the second array comprising the unit pixels not included in the first array, and wherein the controller is configured to control the barrier panel to form the openings so as to expose the unit pixels of the first array, the width of the openings ranging from 1.5 to 2 times the width of the unit pixels.

According to the exemplary embodiments of the present invention, both a moire phenomenon and a cross-talk, which have a trade off relationship, are reduced, and a viewing zone at which a viewer can see a 3-dimensional image may be widened.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 13 is a view sequentially showing operation of the 3-dimensional image display device, according to the exemplary embodiment of FIG. 12.

DETAILED DESCRIPTION OF THE ILLUSTRATED EMBODIMENTS

Figure 1:
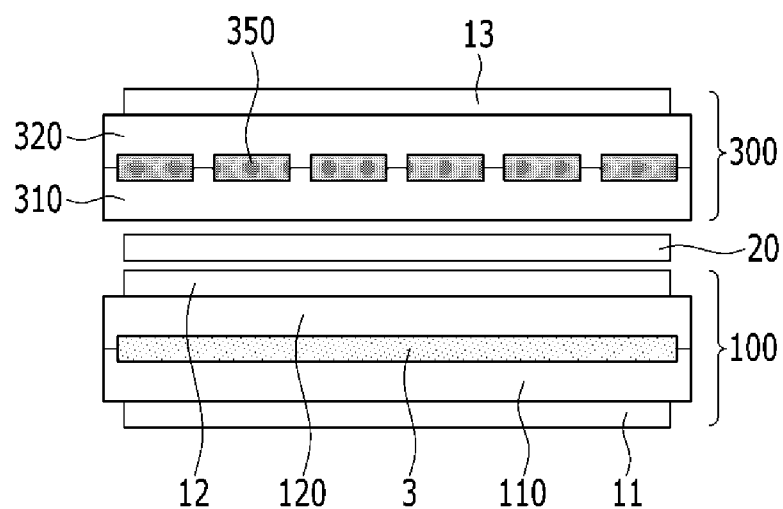
FIG. 1 is a cross-sectional view of a 3-dimensional image display device, according to an exemplary embodiment of the present invention.

Aspects of the present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 2:
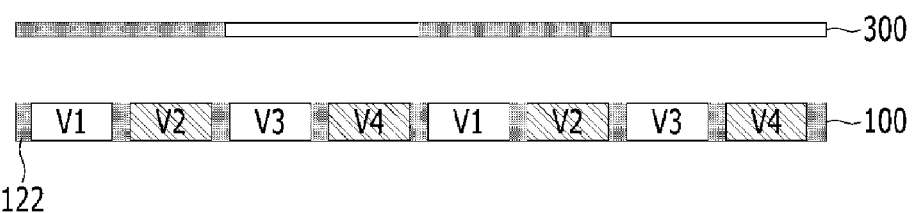
FIG. 2 is a cross-sectional view schematically showing operation of the 3-dimensional image display device, according to the exemplary embodiment of the present invention.

A 3-dimensional image display device according to an exemplary embodiment of the present invention and a driving method thereof will be described in detail with reference to FIG. 1 and FIG. 2. FIG. 1 is a cross-sectional view of a 3-dimensional image display device according to an exemplary embodiment of the present invention, and FIG. 2 is a cross-sectional view schematically showing an operation of the 3-dimensional image display device.

With reference to FIG. 1, the 3-dimensional image display includes a liquid crystal panel 100 and a barrier panel 300. The liquid crystal panel 100 includes a lower panel 110, an upper panel 120, a liquid crystal layer 3, a lower polarizer 11, and an upper polarizer 12.

The lower panel 110 includes a gate line, a data line, and a thin film transistor connected to the gate line and the data line. An output terminal of the thin film transistor is connected to a pixel electrode. Further, a common electrode to form an electric field is formed together with the pixel electrode in the upper panel 120. A color filter (not illustrated) is formed in an opening of a light blocking member (not illustrated). The liquid crystal layer 3 includes liquid crystal molecules. When an electric field is not applied to the liquid crystal layer 3, the liquid crystal molecules may be vertically aligned or horizontally aligned. Various types of liquid crystal molecules may be used in the liquid crystal layer 3.

The liquid crystal panel 100 is a non-emissive element. As such, a backlight unit (not shown) is disposed behind the liquid crystal panel 100. The common electrode may be disposed in the lower panel 110, or the color filter and/or the light blocking member may be disposed in the lower panel 110, according to various embodiments. Since the liquid crystal panel 100 may have various exemplary embodiments, the structure and characteristics of the liquid crystal panel 100 are not particularly limited.

Further, the liquid crystal panel is shown as an example of the image display panel. However, the image display panel alone may be sufficient to practice the present teachings. Therefore, various flat display panels, such as an organic light emitting display panel, a plasma display panel, an electrophoretic display panel, and an electrowetting display panel may be used.

The barrier panel 300 is disposed in front of the liquid crystal panel 100. The barrier panel 300 includes a lower substrate 310, an upper substrate 320, a liquid crystal layer 350 interposed therebetween, and a barrier polarizer 13.

A pair of field generating electrodes is formed on at least one of the lower substrate 310 and the upper substrate 320, to control the liquid crystal layer 350. The alignment direction of the liquid crystal molecules of the liquid crystal layer 350 is changed by an electric field generated by the field generating electrodes to change a polarization characteristic of light passing therethrough. Accordingly, light is selectively transmitted to the barrier polarizer 13. In other words, the barrier panel 300 forms barriers and openings to selectively transmit the light.

Since the upper polarizer 12 is included in the liquid crystal panel 100, the barrier panel 300 does not need a second barrier polarizer. However, according to some embodiments, the upper polarizer 12 may be formed on the barrier panel 300, or two polarizers may be formed between the liquid crystal panel 100 and the barrier panel 300.

In addition, in the case where a flat display panel other than the liquid crystal panel 100 is used as the image display panel, the polarizer may be omitted from the image display panel. In this case, the barrier panel 300 may include essentially the lower polarizer. The liquid crystal panel 100 and the barrier panel 300 are attached to each other by an adhesive 20.

Operation of the aforementioned 3-dimensional image display device will be described with reference to FIG. 2. The liquid crystal panel 100 includes a light blocking member 122 to form openings and barriers, and pixel areas seen through the openings are shown. In the exemplary embodiment, groups of four unit pixels V1, V2, V3 and V4 are disposed in corresponding pixel areas and are used to display images. The unit pixels of the group may display the same or different colors.

That is, in the case of the liquid crystal panel displaying four colors, the group of the four unit pixels may include unit pixels that display different colors, but in the case of the liquid crystal panel displaying three colors, two of the four unit pixels may display the same color. That is, in the case where three colors are aligned in the order of R, G, and B in the liquid crystal panel 100, a first unit pixel group disposed at the leftmost side includes colors of R, G, B, and R, and a next unit pixel group includes colors of G, B, R and G. As described above, even though the unit pixel group includes unit pixels displaying the same color, an image having no problem in color is provided to each eye due to the adjacent pixels. That is, one eye recognizes the image partially hidden by the barrier panel 300, but the device is manufactured so that there is no problem in color of the image recognized by each eye, by displaying the image by the pixel other than the hidden pixel. However, in this case, a resolution may be reduced.

In FIG. 2, unit pixels having diagonal lines display black, and the unit pixels having no diagonal lines are used to display an image. That is, in adjacent unit pixels, one of the unit pixels is black while the other is used to display an image. When the liquid crystal panel 100 is divided into an array of even numbered unit pixels and an array of odd numbered unit pixels, one array displays an image while the other array displays black.

In this case, the barrier panel 300 forms openings that expose two pixels of each group of four unit pixels, and the barrier panel forms barriers that block the remaining two pixels of each group of unit pixels. In FIG. 2, dark portions of the barrier panel 300 denote the barriers, and white portions thereof denote the openings.

FIG. 2 represents a state where the 3-dimensional image display device applies the image displayed by the unit pixels V3 to one eye and applies the image displayed by the pixels V1 to the other eye. That is, the image displayed on the pixels V3 is recognized by only one eye (right eye) and is hidden from the other eye (left eye), and the image displayed on the pixels V1 is recognized by only the left eye and is hidden from the right eye. The aforementioned state is shown in FIG. 3.

Figure 3:
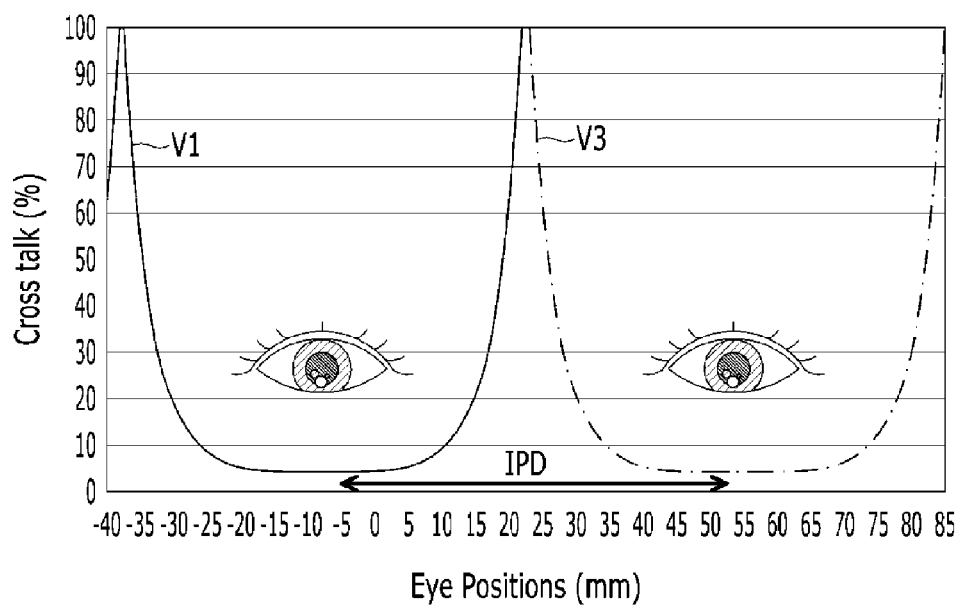
FIG. 3 is a graph showing merits according to driving of the 3-dimensional image display device, according to the exemplary embodiment of FIG. 2.

FIG. 3 is a graph showing results of driving of the 3-dimensional image display device according to the exemplary embodiment of FIG. 2. FIG. 3 shows two eyes, and an interval (IPD) between the two eyes is shown therein. Further, the amount of cross-talk generated by the pixel V1 and the pixel V3, according to the eye position, is shown in the graph. That is, the amount of cross-talk refers to how much the image of V3, which should be applied to only the right eye, is applied to the left eye. When the amount of cross-talk is about 30% or less, the quality of the 3-dimensional image is favorable. A cross-talk amount of 10% or less provides a high quality the 3-dimensional image.

Referring to FIG. 3, since the range of the eye position is about 45 mm or more when the cross-talk is 30% or less, it can be seen that even though the eye is moved by about 45 mm, a favorable 3-dimensional image is assured. The region in which cross-talk of 10% or less occurs is a relatively wide region of about 35 mm. As described above, in the case where the image is provided as shown in FIG. 2, a viewing zone at which a viewer can see the 3-dimensional image (viewing zone hereinafter) is at least about 35 mm.

Meanwhile, in the case where the image is displayed as shown in FIG. 2, after the unit pixels V1 and V3 display the image, the unit pixels V2 and V4 are used to display the image, while the unit pixels V1 and V3 display black. In this case, positions of the openings and the barriers of the barrier panel 300 may be changed when the unit pixels displaying the image change.

That is, when the unit pixels V1 and V3 display the image and the unit pixels V2 and V4 display black may be referred to as a first mode, and when the unit pixels V1 and V3 display black and the unit pixels V2 and V4 display the image may be referred to as a second mode. The first and second modes are alternately driven by time division, in the liquid crystal panel 100. The barrier panel 300 may control the positions of the barriers and openings according to the corresponding mode, to provide different images to each eye of the viewer and thus, display a 3-dimensional image.

As described above, in the case where the first mode and the second mode are alternately used, a relatively high number of the pixels are used to display the image, which increases resolution. However, movement of the barrier may be recognized by a viewer. In the case where the barrier is constantly maintained like shown in FIG. 2, the resolution is lower, but the 3-dimensional image may be stably provided to the viewer. Therefore, among two display modes, the particular display mode used may be selected according to various factors, and one 3-dimensional display device may selectively employ the two display modes.

Figure 4:
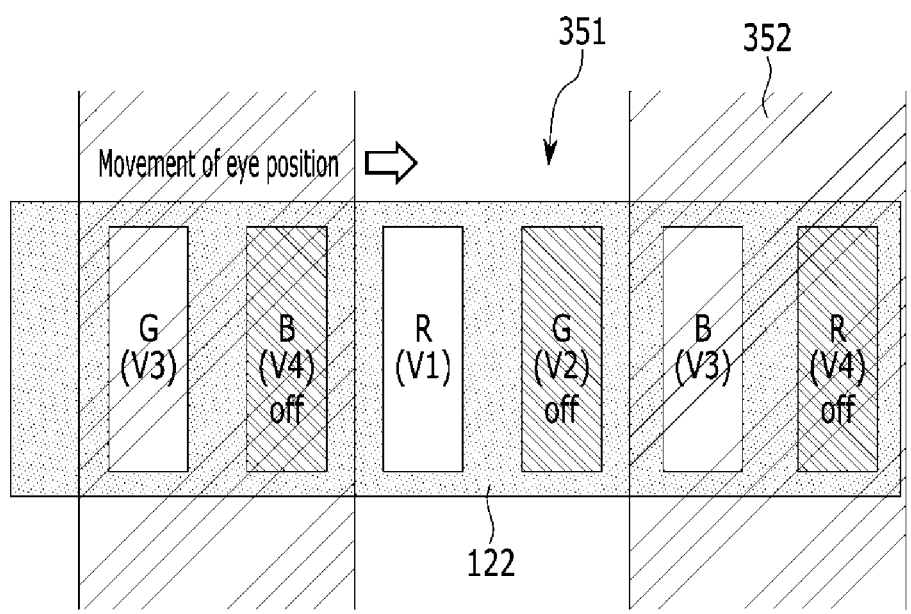
FIGS. 4 and 5 are views more specifically showing merits according to driving of the 3-dimensional image display device, according to the exemplary embodiment of FIG. 2.
Figure 5:
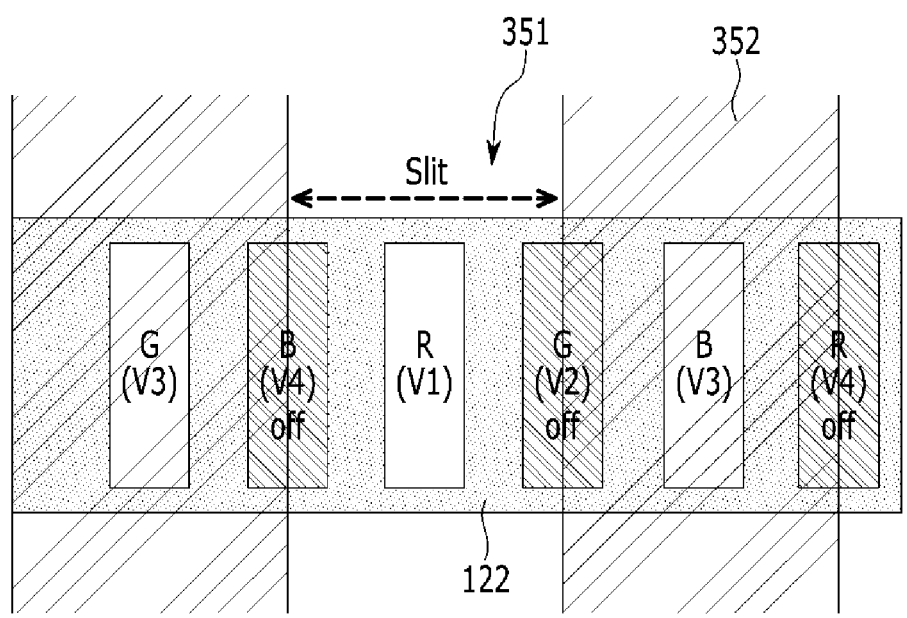

FIGS. 4 and 5 show a difference between portions seen, according to movement of an eye. FIGS. 4 and 5 are views more specifically showing results of driving of the 3-dimensional image display device, according to an exemplary embodiment of FIG. 2.

In the case where the image is displayed like shown in FIG. 2, the recognition by the viewer is the same as that of FIG. 4. In this case, in the present exemplary embodiment, unit pixel V1 displays red (R), V2 displays green (G), V3 displays blue (B), and V4 displays red (R). In the case where the viewer recognizes the image through the left eye, the unit pixel V1 of red (R) is recognized, and the unit pixels V3 and V4 are hidden by a barrier 352 of the barrier panel 300. An opening 351 of the barrier panel 300 may be disposed so that the unit pixel V2 is also exposed, but since the unit pixel V2 displays black (represented by off in FIG. 4), the left eye of the viewer does not receive green light from the unit pixel V2.

As shown in FIG. 5, when a viewer moves, the barrier 352 of the barrier panel 300 covers portions of the unit pixels V2 and V4, and completely covers the unit pixel V3, while the opening 351 exposes portions of the unit pixels V2 and V4 and completely exposes the unit pixel V1. However, since the unit pixels V2 and V4 display black (represented by off in FIG. 4), the left eye of the viewer does not receive green and blue light from the unit pixels V2 and V4. As such, the viewer only receives red light from the unit pixel V1.

As a result, even though the eye of the left eye of the viewer is moved, since the left eye only receives the red light from the unit pixel V1, a wide viewing zone is ensured without generating cross-talk.

The total widths of the opening and the barrier in the barrier panel 300 correspond to the total width of a corresponding group of four unit pixels. The width of the opening is 1.5 to 2 times as wide as the width of one unit pixel. Herein, the width of a unit pixel includes one half of the widths of the portions of light blocking member 122 disposed on opposing sides of the unit pixel. In other words, the width of a unit pixel includes the width of a portion of the light blocking member 122 disposed on the left or right side of a unit pixel, since the opposing portions of the light blocking member 122 generally have the same width.

In FIG. 5, the width of the opening 351 is twice the width of unit pixel V1. When the width of the opening 351 is more than two times the width of a unit pixel, adjacent pixels may be visible. When the width of the opening 351 is less than 1.5 times the width of a unit pixel, adjacent unit pixels are not recognized, even if the adjacent pixels display colors other than black. In the case where the width of the opening is two times as wide as the width of one unit pixel, the widths of the barrier 352 and the unit pixel of the liquid crystal panel 300 may be the same. But in the case where the width of the on-barrier is 1.5 or more and less than 2 times as wide as the width of one unit pixel, the width of the unit barrier of the barrier panel 300 needs to be smaller than the width of the unit pixel.

Comparing FIGS. 4 and 5, since the red pixel V1 is unobstructed in both figures, there is no change in luminance. As a result, a moire pattern is not detected by a viewer due to a change in luminance. Even though the movement range of the eye of the viewer is increased, the change in luminance is insignificant, such that it is not easy for the viewer to detect the moire pattern.

Hereinafter, improved characteristics of the exemplary embodiment of the present invention will be compared to a Comparative Example, with reference to FIGS. 6 to 11. FIGS. 6 to 11 are views showing characteristics according to the driving of 3-dimensional image display devices according to Comparative Examples.

Figure 6:
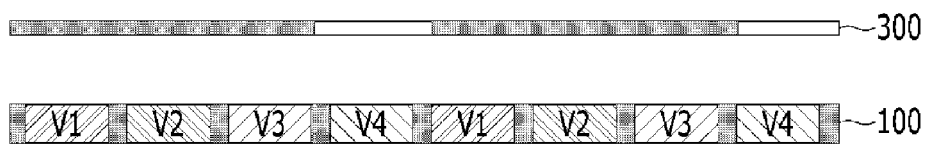
FIGS. 6 to 11 are views showing characteristics according to driving of 3-dimensional image display devices, according to Comparative Examples.

FIG. 6 shows the case where all pixels belonging to the group of the four unit pixels (V1, V2, V3, and V4) of the liquid crystal panel display an image, and the width of an opening in the barrier panel corresponds to the width of one unit pixel, unlike the exemplary embodiment of FIG. 2.

Figure 7:
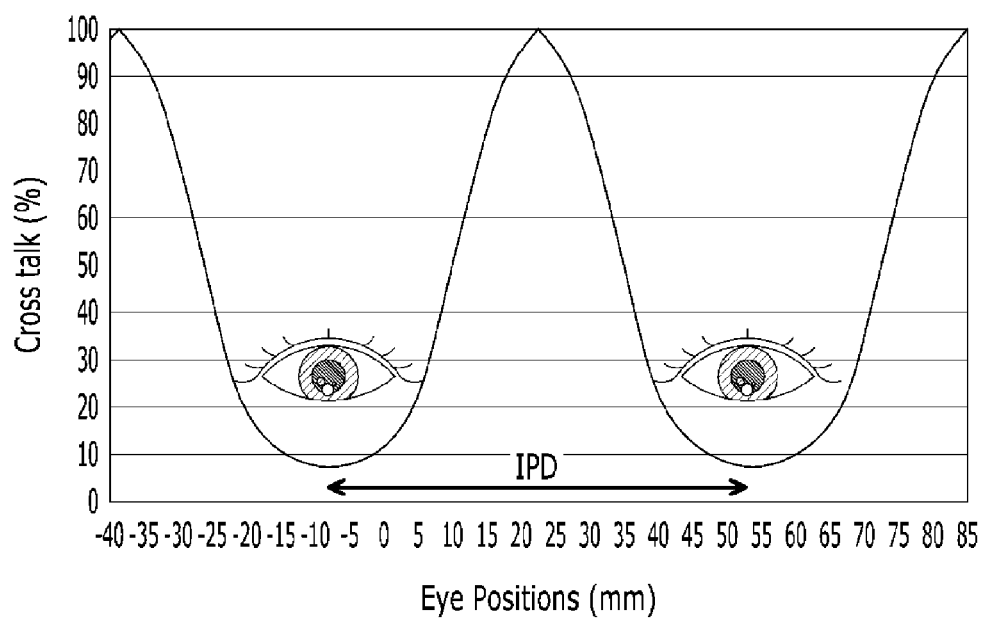
Figure 8:
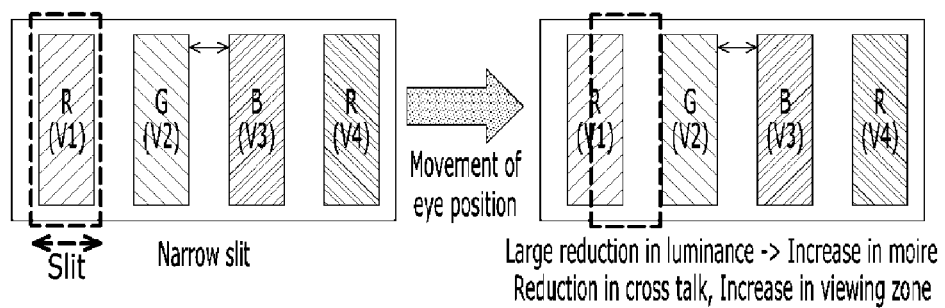

In the case where the 3-dimensional image display device is driven as described above, left and right eye images are formed by using unit pixels V1, V2, V3, and V4 are recognized by each eye, according to the position of the viewer. If a viewer moves slightly, as shown in FIG. 8, the adjacent pixels are recognized, and cross-talk occurs. That is, in FIG. 8, the opening exposes the red unit pixel V1 which is viewed by one eye. When the viewer moves the green unit pixel V2 can be seen. Accordingly, cross-talk is likely to occur. As shown in FIG. 7, it can be seen that the movement range where cross-talk is 10% or less is very narrow, as compared to the case in FIG. 3.

With reference to FIG. 8, since the opening of the barrier is narrow, the luminance reduction is increased as the eye of the viewer is moved, such that a change in luminance according to movement of the viewer is large. The change in luminance is recognized by the viewer as a moire pattern. (See FIG. 9)

Increasing the width of the opening may reduce the moire pattern. However, adjacent pixels may be more easily seen in accordance with movement of the eye of the viewer, thus increasing cross-talk. (See FIG. 9)

Figure 9:
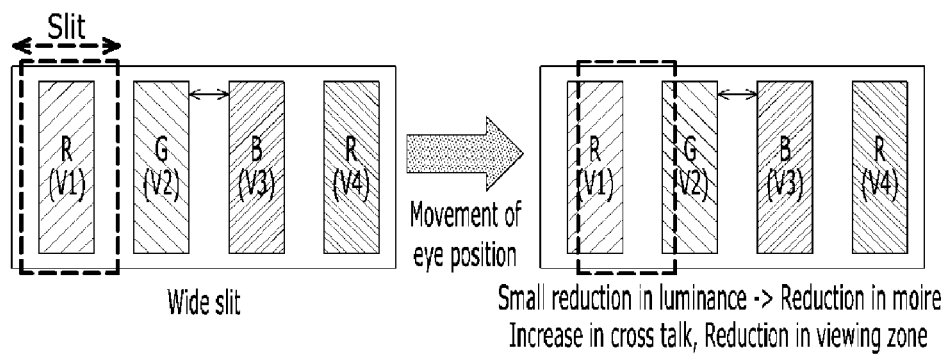

Particularly, in the Comparative Example of FIG. 9, even though the opening of the barrier is relatively wide, so as to further expose adjacent portions of the light blocking region, the opening cannot be larger than 1.5 times the pixel width, due to the generation of cross-talk.

Figure 10:
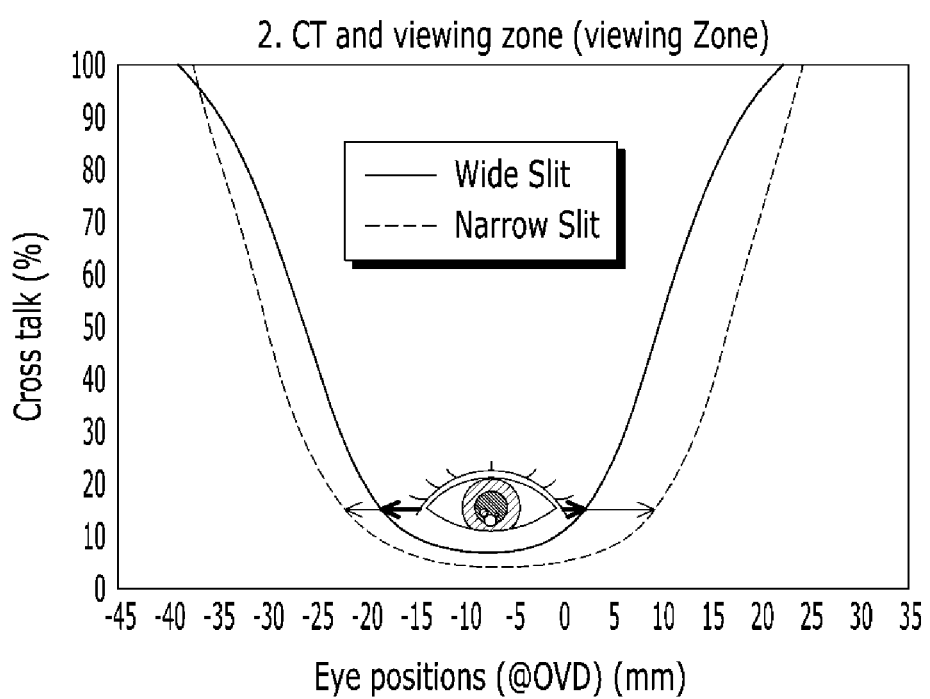
Figure 11:
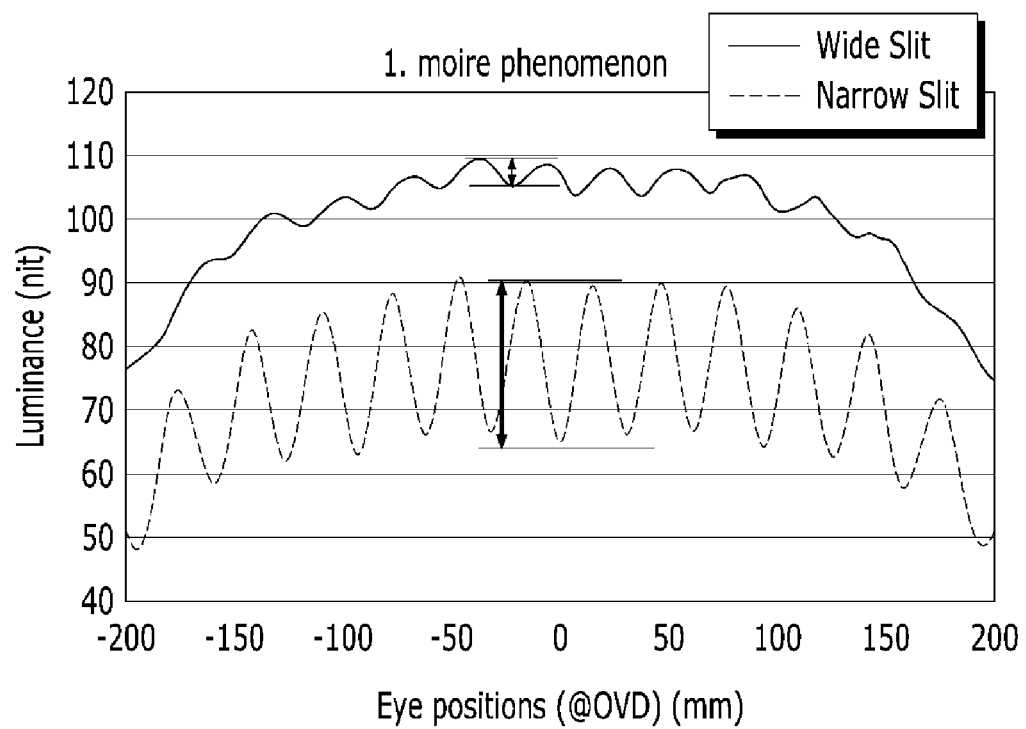

FIGS. 10 and 11 compare characteristics of the Comparative Examples. FIG. 10 shows the cross-talk relationship according to the size of the opening (represented by the slit). That is, it can be seen that the cross-talk is increased as the opening is enlarged. Thus, a viewing zone becomes narrow.

Further, FIG. 11 shows the change in luminance according to the size of the opening (represented by the slit) and the degree of the moire phenomenon produced thereby. That is, it can be seen that the change in luminance is increased as the size of the opening is reduced, which increases the moire phenomenon.

Referring to FIGS. 10 and 11, it is impossible to improve both aspects in the Comparative Examples, because the cross-talk and moire phenomena have a trade off relationship. However, according to the driving method of a 3-dimensional image display device like the exemplary embodiment of FIG. 2, the moire phenomenon and the cross-talk are prevented, without reducing luminance.

Figure 12:
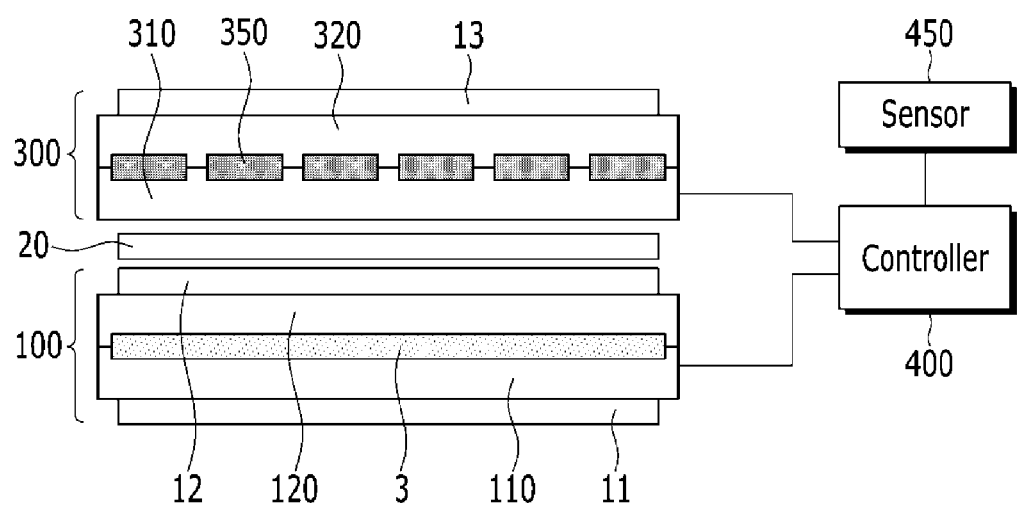
FIG. 12 is a cross-sectional view of a 3-dimensional image display device, according to yet another exemplary embodiment of the present invention.
Figure 14:
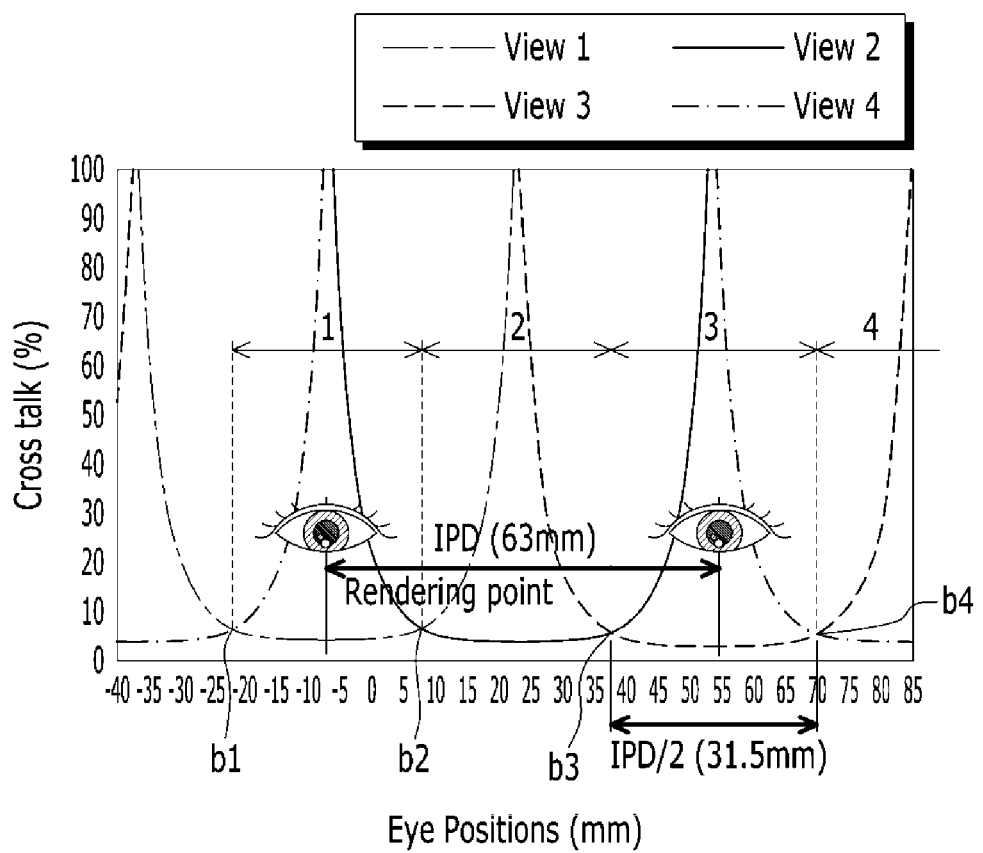
FIG. 14 is a graph showing merits according to driving of the 3-dimensional image display device, according to the exemplary embodiment of FIG. 12.

Hereinafter, another exemplary embodiment of the present invention will be described with reference to FIGS. 12 to 14. FIG. 12 is a cross-sectional view of a 3-dimensional image display device according to yet another exemplary embodiment of the present invention, FIG. 13 is a view sequentially showing operation of the 3-dimensional image display device according to the exemplary embodiment of FIG. 12, and FIG. 14 is a graph showing merits according to driving of the 3-dimensional image display device according to the exemplary embodiment of FIG. 12.

The display device of FIG. 12 is similar to the display device of FIG. 1, but additional includes a sensor 450 and a controller 400. The controller 400 can also be included in the embodiment of FIG. 1.

The sensor 450 is configured to detect the eye position of a viewer and may be an eye tracing sensor. The sensor 450 may detect the positions of both eyes of a viewer, and also a distance between the 3-dimensional display device and each eye.

Information provided from the sensor 450 is transferred to the controller 400. The controller 400 controls the sensor 450, the liquid crystal panel 100, and the barrier panel 300. The barrier panel 300 is driven based on the eye positions of the viewer, and the pixels that are to display black and the pixels that display an image in the liquid crystal panel 100 are selected and operated.

Driving of the 3-dimensional display device will be described in more detail with reference to FIGS. 13 and 14. First, in FIG. 14, View 1 through View 4 are graphs showing the degree of cross-talk according to the eye position, and each correspond to one pixel of the group of four unit pixels. First, View 1 corresponds to the unit pixel (V1) disposed at the leftmost of the group of four unit pixels, and the unit pixels (V2, V3, and V4) disposed at the right thereof correspond to View 2, View 3, and View 4, respectively. Further, in FIG. 13, V1, V2, V3 and V4 represent unit pixels corresponding to View 1 to View 4 of FIG. 14, respectively, and the "off" represents the case where black is displayed.

Referring to the first row of FIG. 13 and FIG. 14, view 1 is best recognized when the eye is between a first boundary b1 and a second boundary b2. As a result, the image is display on on the unit pixel V1 disposed at the leftmost side of each group of four unit pixels, and the unit pixels V2 and V4 adjacent thereto display black. Meanwhile, the image is recognized by the other eye by displaying the image on the unit pixel V3 of each group of four unit pixels.

Referring to the second row of FIG. 13 and FIG. 14, view 2 is best recognized when the eye is disposed between a second boundary b2 and a third boundary b3. As a result, the image is displayed on the unit pixels V2, which are disposed in columns to the right of the columns where the unit pixels V1 were displayed in row 1. The unit pixels V1 and V3s adjacent thereto display the black. Meanwhile, the image is recognized by the other eye by displaying the image on the unit pixel V4.

Referring to the third row of FIG. 13 and FIG. 14, view 3 is best recognized when the eye is disposed between a third boundary b3 and a fourth boundary b4. As a result, the image is displayed on the pixels V3 disposed on column to the right of the columns where the unit pixels V2 were displayed in row 2. The unit pixels V2 and V4 adjacent thereto display black. Meanwhile, the image is recognized by the other eye by displaying the image on the unit pixels V1.

The position of the unit pixel V1 in a third row of FIG. 13 is the same as the position of the blue unit pixel V3 in the first row thereof. In this exemplary embodiment, the position of the groups of unit pixels is moved to the right by two columns, and the position essentially does not need to be moved. In the case where the group of the unit pixels is moved as described above, the unit pixels V1 and V2s are alternately recognized by using luminance applied to one eye, thus increasing the 3-dimensional sense. Further, according to the exemplary embodiment of the present invention, if the position of unit pixels V1 to V4 displaying the image is changed based on information on the eye position of a viewer traced from the sensor 450, there is an effect of reducing the cross-talk and the movement disparity, when a viewing position of the viewer is changed. Meanwhile, data voltages applied to the unit pixels V1 and pixel V2 may be the same voltage according to the exemplary embodiment.

Referring to the fourth row of FIG. 13 and FIG. 14, view 4 is best recognized when the eye is disposed between the fourth boundary b4 and the next first boundary b1. As a result, it is preferable to display the image on the unit pixel V2 disposed at the rightmost column of the group of four unit pixels, and the unit pixels V1 and V3 adjacent thereto display black. Meanwhile, the image is recognized by the other eye by displaying the image on the unit pixel V4.

As described above, the pixel displaying the image in the liquid crystal panel 100 is unidirectionally moved (to the right in FIG. 13) in accordance with movement of the eye, as shown in FIG. 13. Further, in FIG. 14, the distance between the boundaries corresponds to a half (IPD/2) of the distance (IPD) between two eyes. As such, the driving mode may be changed when the viewer moves by a distance equal to half of the distance between two eyes.

As described above, if the barrier panel 300 and the liquid crystal panel 100 are controlled like FIG. 13 and FIG. 14, since the 3-dimensional image is displayed while cross-talk values at the first to the fourth boundaries (b1, b2, b3, and b4) become a maximum value in FIG. 14, it is possible to ensure the best quality of the 3-dimensional image, with the cross-talk being 10% or less. Moreover, there is a small change in luminance, such that the moire phenomenon is not recognized.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A driving method of a 3-dimensional image display device that comprises a display panel comprising a matrix of unit pixels and a barrier panel disposed on the display panel, the driving method comprising:
   using a first array of the unit pixels to display an image and using a second array of the unit pixels to display black, the second array comprising the unit pixels not included in the first array; and
   forming openings in the barrier panel to expose the first array of unit pixels, the width of the each opening ranging from 1.5 to 2 times the width of one unit pixel,
   wherein the unit pixels are arranged in unit pixel groups that comprise four consecutive unit pixels in a row direction; and
   wherein each unit pixel group comprises two unit pixels of the first array and two unit pixels of the second array, and each of the unit pixels of the first array is alternatively arranged with respect to each of the unit pixels of the second array along the row direction.

2. The driving method of claim 1, wherein the barrier panel comprises barriers between the openings that at least partially cover the second array of unit pixels.

3. The driving method of claim 1, wherein
   the unit pixel groups each comprise two unit pixels that are configured to display the same color excluding black.

4. The driving method of claim 3, wherein in each unit pixel group, the unit pixels included in the first array are disposed in one of odd or even numbered rows, and the unit pixels included in the second array are disposed in the other of the odd or even numbered rows.

5. The driving method of claim 4, wherein the width of the openings is two times the width of the one unit pixel.

6. The driving method of claim 1, further comprising:
   using a third array of the unit pixels to form an image and using a fourth array of the unit pixels to display black, the fourth array comprising the unit pixels not included in the third array; and
   moving the openings of the barrier panel to expose the third array of unit pixels.

7. The driving method of claim 6, wherein a combination of the first and third arrays of the unit pixels comprises all of the unit pixels.

8. The driving method of claim 1, further comprising detecting the position of the eyes of a viewer of the display device.

9. The driving method of claim 8, further comprising using a third array of the unit pixels to display an image, unit pixels of the third array being selected according to the detected eye positions.

10. The driving method of claim 9, wherein the unit pixels of the third array are disposed laterally with respect to corresponding unit pixels of the first array.

11. The driving method of claim 9, wherein the barrier panel forms barriers between the openings that at least partially cover the unit pixels not included in the third array.

12. The driving method of claim 11, wherein
   the unit pixel groups each comprises two pixels configured to display the same color other than black.

13. The driving method of claim 12, wherein in each unit pixel group, the unit pixels included in the first array are disposed in one of odd or even numbered rows, and the unit pixels included in the second array are disposed in the other of the odd or even numbered rows.

14. The driving method of claim 13, wherein the width of the openings is two times the width of the one unit pixel.

15. The driving method of claim 1, wherein the size of the openings is constant and does not change.

16. A 3-dimensional image display device, comprising:
   a display panel comprising a matrix of unit pixels;
   a barrier panel disposed on the display panel and configured to form barriers and openings to selectively expose the unit pixels; and
   a controller configured control the display panel and the barrier panel,
   wherein the controller is configured to use a first array of the unit pixels to form an image and to use a second array of the unit pixels to display black, the second array comprising the unit pixels not included in the first array,
   wherein the controller is configured to control the barrier panel to form the openings to expose the unit pixels of the first array, the width of the openings ranging from 1.5 to 2 times the width of one unit pixel,
   wherein the unit pixels are arranged in unit pixel groups that comprise four consecutive unit pixels in a row direction; and
   wherein each unit pixel group comprises two unit pixels of the first array and two unit pixels of the second array, and each of the unit pixels of the first array is alternatively arranged with respect to each of the unit pixels of the second array along the row direction.

17. The 3-dimensional image display device of claim 16, further comprising a sensor to detect the positions of eyes of a viewer of the display device,
   wherein the controller is configured to select the unit pixels included in the first array according to the eye positions detected by the sensor.

18. The 3-dimensional image display device of claim 17, wherein the barrier panel forms the barriers to at least partially cover the unit pixels included in the second array.

19. The 3-dimensional image display device of claim 17, wherein
   the unit pixel groups each comprises two pixels configured to display the same color other than black.

20. The 3-dimensional image display device of claim 18, wherein in each unit pixel group, the unit pixels in the first array are disposed in one of odd or even numbered rows, and the unit pixels of the second array are disposed in the other of the odd or even numbered rows.

21. The 3-dimensional image display device of claim 20, wherein the width of the openings is two times the width of the one unit pixel.

22. The 3-dimensional image display device of claim 16, wherein the size of the openings is constant and does not change.

23. A driving method of a 3-dimensional image display device that comprises a display panel comprising a matrix of unit pixels and a barrier panel disposed on the display panel, the driving method comprising:
   using a first array of the unit pixels to display an image and using a second array of the unit pixels to display black, the second array comprising the unit pixels laterally flanking the unit pixels of the first array;

forming openings in the barrier panel to expose the first array of unit pixels, the width of the each opening ranging from 1.5 to 2 times the width of the exposed unit pixels;

detecting a change in position of a viewer of the display device;

using a third array of the unit pixels to display an image and using a fourth array of the unit pixels to display black, the third array comprising the unit pixels laterally flanking the unit pixels of the second array, wherein the unit pixels of the third array are selected according to the detected change in position of the viewer, and the unit pixels are arranged in unit pixel groups that comprise four consecutive unit pixels in a row direction; and wherein each unit pixel group comprises at least one unit pixel of the first array and at least one unit pixel of the second array.

24. The method of claim 23, further comprising moving the openings in the barrier panel to expose the third array.

25. The method of claim 23, wherein the size of the openings is constant and does not change.

\* \* \* \* \*